United States Patent
Tsuruta

(10) Patent No.: US 7,526,592 B2
(45) Date of Patent: Apr. 28, 2009

(54) INTERRUPT CONTROL SYSTEM AND STORAGE CONTROL SYSTEM USING THE SAME

(75) Inventor: Susumu Tsuruta, Odawara (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 11/604,690

(22) Filed: Nov. 28, 2006

(65) Prior Publication Data
US 2008/0082713 A1   Apr. 3, 2008

(30) Foreign Application Priority Data
Sep. 29, 2006   (JP)   ............... 2006-267510

(51) Int. Cl.
*G06F 13/24* (2006.01)
*G06F 13/38* (2006.01)
(52) U.S. Cl. .................... 710/268; 710/262
(58) Field of Classification Search .......... 710/262, 710/268, 309
See application file for complete search history.

(56) References Cited

U.S. PATENT DOCUMENTS 5,848,278 A   12/1998   Sakai
7,162,559 B1 *   1/2007   Kallat et al. ............... 710/262
7,330,926 B2 *   2/2008   Ho ............................ 710/311
2001/0032287 A1 *   10/2001   Lai et al. ................... 710/260
2005/0228923 A1 *   10/2005   Zimmer et al. ........... 710/269

FOREIGN PATENT DOCUMENTS

| JP | 07-084970 | 9/1993 |
| JP | 09-097177 | 9/1995 |
| JP | 2001-331329 | 5/2000 |

OTHER PUBLICATIONS

PCI Special Interest Group; "PCI Express(TM) Base Specification"; PCI Special Interest Group; Revision 1.0a; Apr. 15, 2003; all pages.*

* cited by examiner

*Primary Examiner*—Paul R Myers
*Assistant Examiner*—Ryan M Stiglic
(74) *Attorney, Agent, or Firm*—Reed Smith LLP; Stanley P. Fisher, Esq.; Juan Carlos A. Marquez, Esq.

(57) ABSTRACT

An interrupt control system is provided where a signal-line-based interrupt system can be incorporated into interrupt control using MSIs (Message Signal Interrupts). The interrupt control system includes a first PCI interface, a second PCI interface, a PCI bridge serving as a bridge between the first PCI interface and the second PCI interface, and a control circuit for controlling an interrupt signal. The PCI bridge recognizes a message signal interrupt issued from the first PCI interface to the second PCI interface and transfers the message signal interrupt to the control circuit, and the control circuit is provided with an interrupt conversion unit for converting the message signal interrupt into an interrupt signal and outputting it via a signal line.

19 Claims, 9 Drawing Sheets

FIG.6

| MSI | SIGNAL-LINE-BASED INTERRUPT SIGNAL (a, b, c, d) | INTERRUPT HANDLER |
|---|---|---|
| MSI(1) | 0001 | A |
| MSI(2) | 0010 | B |
| MSI(3) | 0011 | C |
| ⋮ | ⋮ | ⋮ |
| MSI(15) | **** | 0 |

INTERRUPT CONTROL SYSTEM AND STORAGE CONTROL SYSTEM USING THE SAME

CROSS-REFERENCES TO RELATED APPLICATIONS

This application relates to and claims priority from Japanese Patent Application No. 2006-267510, filed on Sep. 29, 2006, the entire disclosure of which is incorporated herein by reference.

BACKGROUND

1. Field of the Invention

The present invention relates to an interrupt control system and a storage control system using that interrupt control system. More specifically, the present invention relates to an interrupt control system using Message Signal Interrupts (hereinafter abbreviated to "MSIs"), and a storage control system using that interrupt control system.

2. Description of Related Art

Conventional storage control systems include: a host control LSI that controls communication with information processing apparatuses; a (storage) disk control LSI that controls communication with storage devices; cache memory; a data transfer control LSI; and an MP control unit. The data transfer control LSI serves as a bridge between the host control LSI and the MP control unit, or as a bridge between the disk control LSI and the MP control unit, for control information (e.g. data input/output requests), and also conducts control for data transfer between the host control LSI and the cache memory, or data transfer between the disk control LSI and the cache memory. The MP control unit controls the host control LSI, disk control LSI and data transfer LSI, in response to control information (e.g. data input/output requests) from host apparatuses.

The host control LSI and the disk control LSI each have conventionally been configured to be connected to the data transfer control LSI via PCI buses, and to send interrupts to the MP control unit via interrupt signal lines according to events that occur internally.

As art related to the above type of interrupt control, for example, Japanese Patent Laid-open Publication No. 07-084970 discloses an interrupt control method that aims at improving performance in data processing by preventing data processing in a CPU from being interrupted based on an interrupt sent to that CPU when that CPU is not the CPU for executing processing for the device where the interrupt originated. This interrupt control method is characterized in that, in a data processing method for a system having a plurality of CPUs and a plurality of devices wherein each CPU executes data processing for predetermined device(s), an interrupt controller for recognizing, when an interrupt signal is output from one device, the interrupt source device, and an interrupt table for setting the association between the devices and the CPUs in the interrupt controller are provided.

Also, an interrupt control system for a computer system disclosed in Japanese Patent Laid-open Publication No. 09-097177 aims at minimizing the number of signal lines used for transferring a plurality of interrupt signals in a personal computer such as a laptop computer or a notebook computer where an extension unit can be used, thereby increasing the number of signals available in the extension unit and simplifying the wiring configuration of the signal lines in the system. This system is an interrupt control system for a computer system that inputs a plurality of interrupt signals and has an interrupt controller for recognizing the type of use set in advance for each interrupt signal, and the system is characterized in having: interrupt encoder means for converting a plurality of interrupt signals to serial data, the interrupt signals being sent from a source device that makes an interrupt request to a processor; serial transfer means for transferring the serial data; and interrupt decoder means for converting the serial data transferred from the serial transfer means to the original interrupt signals, and giving those interrupt signals to the interrupt controller.

Also, an invention disclosed in Japanese Patent Laid-open Publication No. 2001-331329 aims at providing an interrupt control method and interrupt control apparatus that can dynamically respond to various situations and constantly achieve optimum system performance, and it is characterized in: monitoring the system status; setting a dynamically variable number of device interrupts collected when generating a processor interrupt, based on the monitoring result; generating a processor interrupt by collecting the set number of device interrupts; and outputting the processor interrupt to a processor.

SUMMARY

A PCI-based interrupt control system has a problem in that interrupt signal lines are necessary and so control elements cannot be efficiently mounted onto a substrate. Meanwhile, a serial transfer interface called PCI Express is based on using MSIs, and has the advantage of not requiring interrupt signal lines. MSIs or MSI-Xs are forms for sending an interrupt request as a message via PCI Express.

When an LSI receives an MSI, the LSI recognizes it as a interrupt request and executes interrupt processing. In other words, an LSI supporting PCI Express can replace receipt of an interrupt signal via signal lines with checking of an MSI. Accordingly, since a communication protocol using MSIs does not need interrupt signal lines, improved efficiency can be achieved in implementing LSIs and wiring for a control substrate. Furthermore, interrupt architecture using MSIs can use a message, which is able to contain various interrupt-related information. In interrupt architecture only using interrupt signal lines, all that can be used are ON/OFF signals (existence or non-existence of an interrupt).

However, an LSI based on an OS not supporting PCI Express cannot use MSIs. So, it has been necessary to change all LSIs to those supporting PCI Express, and to upgrade the OS too.

In light of the above, in order to solve the above-described problems, an object of the present invention is to provide an interrupt control system in which a signal-line-based interrupt system can be incorporated into MSI based interrupt control. Another object of the invention is to provide an interrupt control system that uses MSIs and signal-line-based interrupts in combination and can achieve improved performance compared to an MSI-only system. Another object of the invention is to provide an interrupt control system that can realize converting MSIs into signal-line-based interrupts. Another object of the invention is to provide a storage control system using the above-described interrupt control systems.

In order to achieve the above objects, the present invention is characterized in providing an interrupt control system having a conversion unit for recognizing an MSI from information sent from a first controller to a second controller and converting the MSI into a signal-line-based interrupt.

According to a first aspect of the invention, provided is an interrupt control system including: a first PCI interface; a second PCI interface; a PCI bridge serving as a bridge between the first PCI interface and the second PCI interface; and a control circuit for controlling an interrupt signal. The PCI bridge recognizes a message signal interrupt issued from the first PCI interface to the second PCI interface, and transfers the message signal interrupt to the control circuit, and the control circuit includes an interrupt conversion unit for converting the message signal interrupt into an interrupt signal and outputting the converted signal via a signal line.

According to a second aspect of the invention, provided is an interrupt control method executed by a conversion circuit for an interrupt signal, the method including: a step of the conversion circuit converting a message signal interrupt input to the conversion circuit into an interrupt signal; and a step of the conversion circuit sending the converted interrupt signal to a control circuit via a signal line, the control circuit being the destination for the message signal interrupt.

According to a third aspect of the invention, provided is a storage control system having a controller for controlling information exchange between an information processing apparatus and a storage apparatus, the controller including: a first controller for controlling information exchange between the controller and the information processing apparatus and also between the controller and the storage apparatus; a second controller for controlling the first controller; and a third controller for controlling information exchange between the first controller and the second controller. The third controller has an interrupt conversion unit for converting a message signal interrupt issued from the first controller to the second controller into an interrupt signal, and outputting the converted interrupt signal to the second controller.

As described above, according to the present invention, it is possible to provide an interrupt control system that can incorporate a signal-line-based interrupt system into MSI-based interrupt control. It is also possible to provide an interrupt control system that uses MSIs and signal-line-based interrupts in combination and can achieve improved performance compared to a system using MSIs only. It is also possible to provide an interrupt control system that can achieve converting MSIs into interrupt signals to be sent using signal lines. It is also possible to provide a storage control system using the above-described interrupt control systems.

Other aspects and advantages of the invention will be apparent from the following description and the appended claims.

BRIEF DESCRIPTION OF THE DRAWINGS

FIG. 6 illustrates an example of a control table for realizing conversion of interrupts from MSIs to interrupt signals.

DETAILED DESCRIPTION OF PREFERRED EMBODIMENTS

Figure 1:
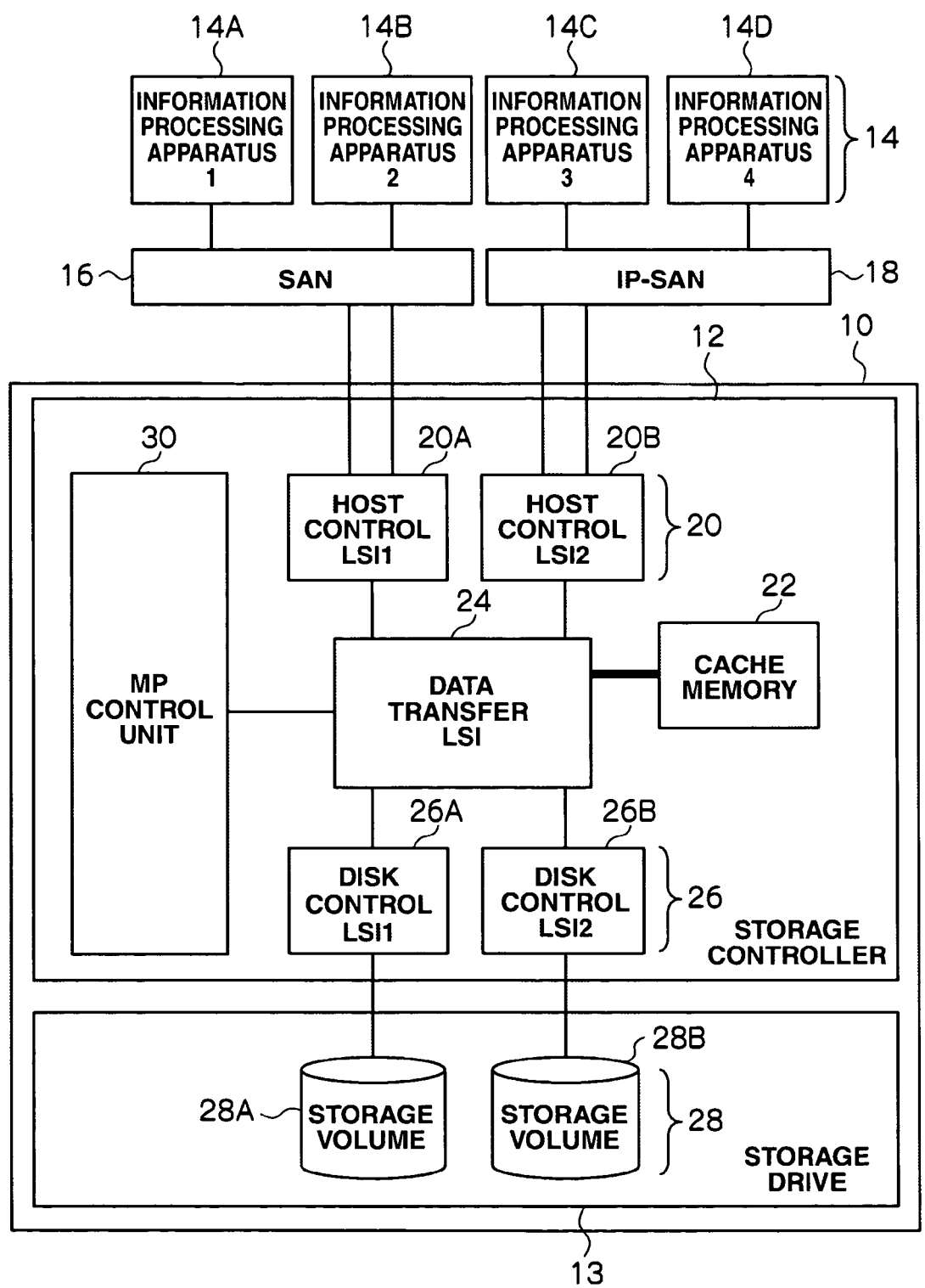
FIG. 1 is a hardware block diagram showing an example of a storage control system according to the present invention.

A storage control system according to the present invention will be explained below, referring to some embodiments. FIG. 1 is a hardware block diagram illustrating an overall storage control system. The storage control system is also called a storage system, and has a plurality of storage devices and providing a storage area for information processing apparatuses.

The storage system 10 includes a storage controller 12 and a storage drive 13. The storage controller 12 controls the storage drive 13 in accordance with commands received from information processing apparatuses 14, i.e., host apparatuses. For example, the storage controller 12 receives a data input/output request for the storage drive from an information processing apparatus 14, and reads/writes data from/to storage volume(s) 28 provided in the storage drive.

Each information processing apparatus is an information apparatus provided with a CPU (Central Processing Unit) and memory, such as a computer. By having the CPU provided in the information processing apparatus executing various programs, various functions are realized.

In FIG. 1, the information processing apparatuses 14A and 14B are connected to the storage controller 12 via a SAN (Storage Area network) 16 so that they can communicate with the storage controller 12. The SAN is a network over which data input/output requests and data are sent and received between the storage controller 12 and the information processing apparatuses 14A and 14B based on Fibre Channel Protocol.

The information processing apparatuses 14C and 14D are connected to the storage controller via an IP-SAN (Internet Protocol-SAN) 18. The IP-SAN is a network over which data input/output requests and data are sent and received between the storage controller and the information processing apparatuses 14c and 14D based on Internet Protocol.

The storage drive 13 is provided with multiple physical disk drives for storing data. The physical disk drives are examples of storage devices. Semiconductor memory such as flash memory may also be used as storage devices.

Because multiple physical disk drives are installed in the storage drive 13 in array, the storage drive 13 can provide a large storage capacity for the information processing apparatuses 14. The physical disk drives may be data storage media such as hard disk drives, or may also be composed of several hard disk drives constituting RAID (Redundant Arrays of Inexpensive Disks).

Also, in physical volumes, which are physical storage areas provided by the physical disk drives, logical volumes, which are logically defined storage areas, can be established. Storage areas for storing data, including physical volumes and logical volumes, are also called storage volumes. FIG. 1 illustrates a plurality of storage volumes 28A and 28B.

Instead of the configuration shown in FIG. 1 where the storage controller is directly connected to the storage drive, the storage controller may also be configured to be connected to the storage drive via a network. Furthermore, the storage drive and the storage controller may be provided in the same case, i.e., as an integrated structure.

The storage controller 12 has: host control LSIs 20 (20A and 20B), a data transfer control LSI 24, disk control LSIs 26 (26A and 26B), cache memory 22, and an MP control unit 30. The storage controller communicates with the information processing apparatuses 1-4 from the host control LSIs 20 via the SAN/IP-SAN. The "host" in the "host control LSI 20" means an information processing apparatus (host apparatus). The "disk" in the "disk control LSI 26" means a hard disk, which is a storage device.

The host control LSIs 20 communicate with the information processing apparatuses 14 using Fibre Channel Protocol or Internet Protocol, receive data input/output requests from the information processing apparatuses, and send and receive data to and from the information processing apparatuses. The disk control LSIs 26 are connected to the storage volumes for storing data so that they can communicate with the storage volumes, and control the storage drive.

The data transfer control LSI 24 serves as a bridge between the host control LSIs 20 and the MP control unit 30, or as a bridge between the disk control LSIs 26 and the MP control unit 30, for control information (e.g. data input/output requests), and also controls data transfer between the host control LSIs 20 and the cache memory 22, or data transfer between the disk control LSIs 26 and the cache memory 22. The MP control unit 30 controls the host control LSIs 20, disk control LSIs 26, and data transfer control LSI 24, in accordance with control information (e.g. data input/output requests) from the information processing apparatuses. The cache memory 22 is memory for temporarily storing data transmitted between the host control LSIs 20 and the storage volumes 28, and between the disk control LSIs 26 and the storage volumes 28.

For example, when one host control LSI 20 receives a data input request from an information processing apparatus 14, the host control LSI 20 transfers the request to the MP control unit 30 via the data transfer control LSI 24. When the MP control unit 30 detects the transferred data input request, the MP control unit 30 sets up the data transfer control LSI 24 in accordance with that request, and instructs the host control LSI 20 to start transferring data, and then the data is stored in the cache memory 22 from the host control LSI via the data transfer control LSI 24.

When the data has been stored in the cache memory 22, the host control LSI 20 reports the completion of the data storage to the MP control unit 30. Then, after detecting the completion of the data storage, the MP control unit 30 sets up the data transfer control LSI 24, and instructs the relevant disk control LSI 26 to transfer the data to storage volume(s) 28, and then the data is stored in the storage volume(s) 28 from the cache memory 22 via the data transfer control LSI 24 and the disk control LSI 26.

When a host control LSI 20 receives a data output request from an information processing apparatus 14, the host control LSI 20 checks if the target read data is in the cache memory 22. If the read data is not in the cache memory, the MP control unit 30 sets up the data transfer control LSI 24, instructs the relevant disk control LSI 26 to start transferring data so that the target read data is stored in the cache memory 22 from the storage volume(s) 28. If the read data is in the cache memory 22, or if the target data has been stored in the cache memory 22 by the above transfer, the MP control unit 30 sets up the data transfer control LSI 24, and instructs the host control LSI 20 to start transferring data so that the read data is transmitted to the information processing apparatus 14. The host control LSIs 20 and the disk control LSIs 26 correspond to the first controller in the appended claims, the MP control unit corresponds to the second controller, and the data transfer control LSI 24 corresponds to the third controller in the appended claims.

Figure 2:
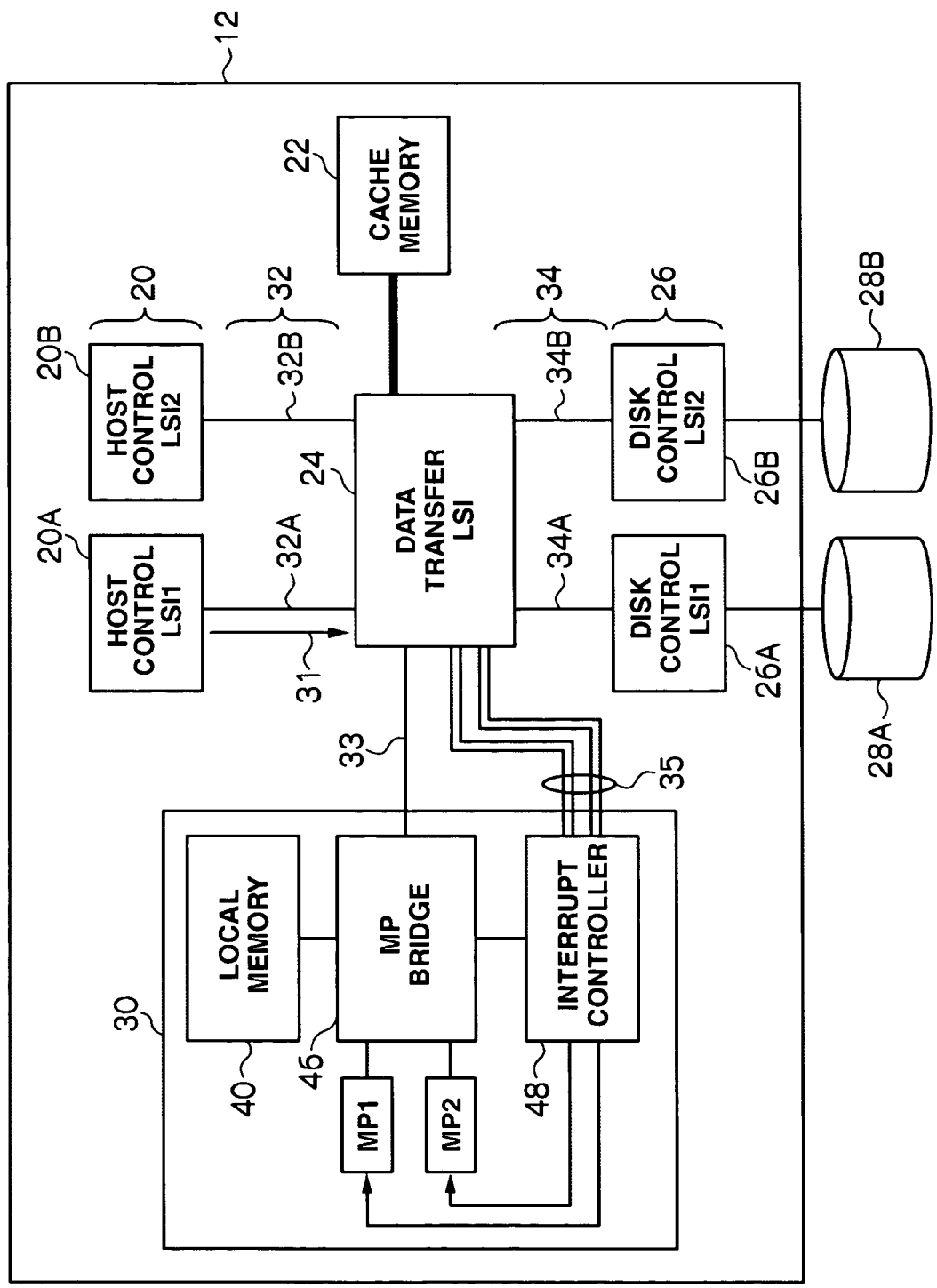
FIG. 2 is a hardware block diagram showing an example of the specific configuration of the storage controller shown in FIG. 1.

FIG. 2 is a block diagram of the storage controller 12, including the specific hardware block configuration of the MP control unit 30 ("MP" stands for a microprocessor). The MP control unit includes an MP 1, an MP 2, an MP bridge 46, an interrupt controller 48 and local memory 40. By the MP 1 and MP 2 executing various programs stored in the local memory 40, the MP control unit 30 realizes data input/output control and other various functions.

The MP bridge 46 connects the MP 1, MP 2, local memory 40, and interrupt controller 48, and is also provided with PCI as an external interface of the MP control unit 30. The interrupt controller 48 functions to receive interrupt events generated in the host control LSIs 20, etc., as signals, from the outside of the MP control unit 30 (via the data transfer LSI 24 in FIG. 2), and to send them to the MP 1 and MP 2.

Communication via buses 32A and 32B between the host control LSIs 20 and the data transfer control LSI 24, and communication via buses 34A and 34B between the disk control LSIs 26 and the data transfer control LSI 24 both support PCI Express protocol. Communication via a bus 33 between the MP bridge 46 and the data transfer control LSI 24 supports PCI interface protocol including PCIX and PCI Express. The data transfer control LSI 24 also functions as a PCI-to-PCI bridge. In PCI Express, which is the latest specification in PCI, parallel interfaces that use multiple signal lines for control, employed in the conventional PCI/PCIX, have been changed to serial interfaces. PCI Express is premised on MSIs being used as interrupts.

Each of the host control LSIs 20 and the disk control LSIs 26 generates an interrupt 31, which is an MSI, according to an event that occurs internally, and sends it to the data transfer control LSI 24 via the PCI Express bus 32 or 34. Between the data transfer control LSI 24 and the interrupt controller 48, signal lines 35 for transmitting an interrupt signal composed of an "H" bit or an "L" bit are provided. The data transfer control LSI 24 sends an interrupt signal of bits corresponding to the number of signal lines, e.g. 4 bits if there are 4 signal lines, to the interrupt controller 48. When receiving an interrupt signal from the interrupt controller, the MP (MP 1 or MP 2) selects a specific interrupt handler [program] from among a plurality of interrupt handlers stored in the local memory 40, and executes it.

The data transfer control LSI 24 employing a PCI-to-PCI bridge traps an MSI and converts it into a signal-line-based interrupt signal. Since the MP control unit 30 receives interrupt signals via the interrupt signal lines 35, it does not necessarily support PCI Express. Note that, if the MP control unit 30 supports PCI Express, the data transfer control LSI can have an MSI received via the PCI Express bus 33, without converting it into a signal-line-based interrupt signal. Obviously, if the MP control unit supports PCI and PCIX only, the MP control unit receives interrupt signals via the interrupt signal lines 35, as explained above. MSI is part of the PCI specifications, and the details are described in PCI-SIG's "PCI Local Bus Specification, Revision 3.0" and "PCI Express Base Specification, Revisions 1.0, 1.0a, and 1.1."

Figure 3:
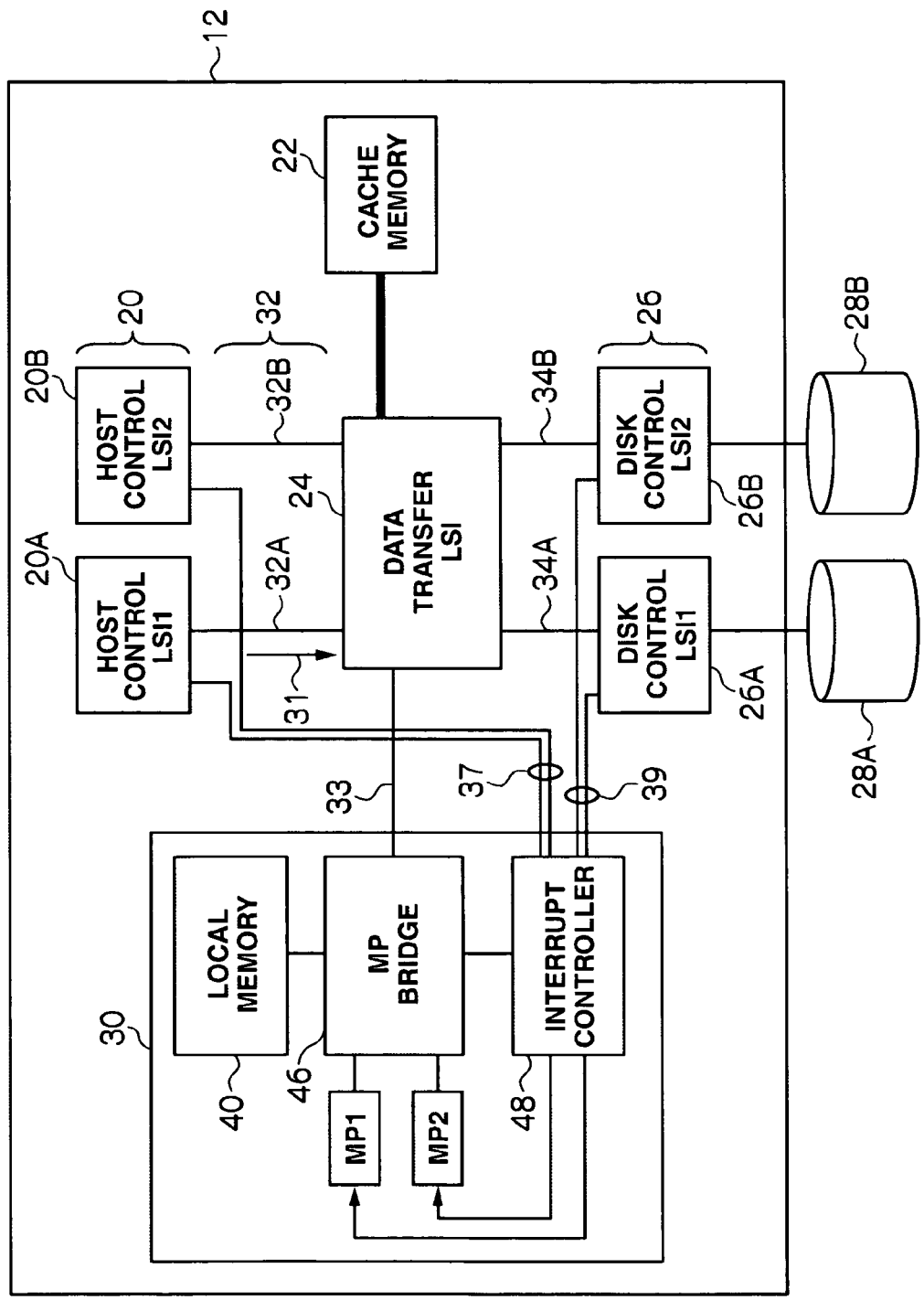
FIG. 3 is a hardware block diagram showing the specific configuration of a storage controller, as a comparative example of the storage controller shown in FIG. 2.

For reference, FIG. 3 shows a block diagram of a storage controller, as a comparative example of FIG. 2. FIG. 3 is different from FIG. 2 in that interrupt signal lines 37 and 39 are provided to extend, respectively from host control LSIs 20 and from disk control LSIs 26, to an interrupt controller 48. In FIG. 3, each of the host control LSIs and the disk control LSIs is connected to a data transfer control LSI via a PCI bus.

Figure 4:
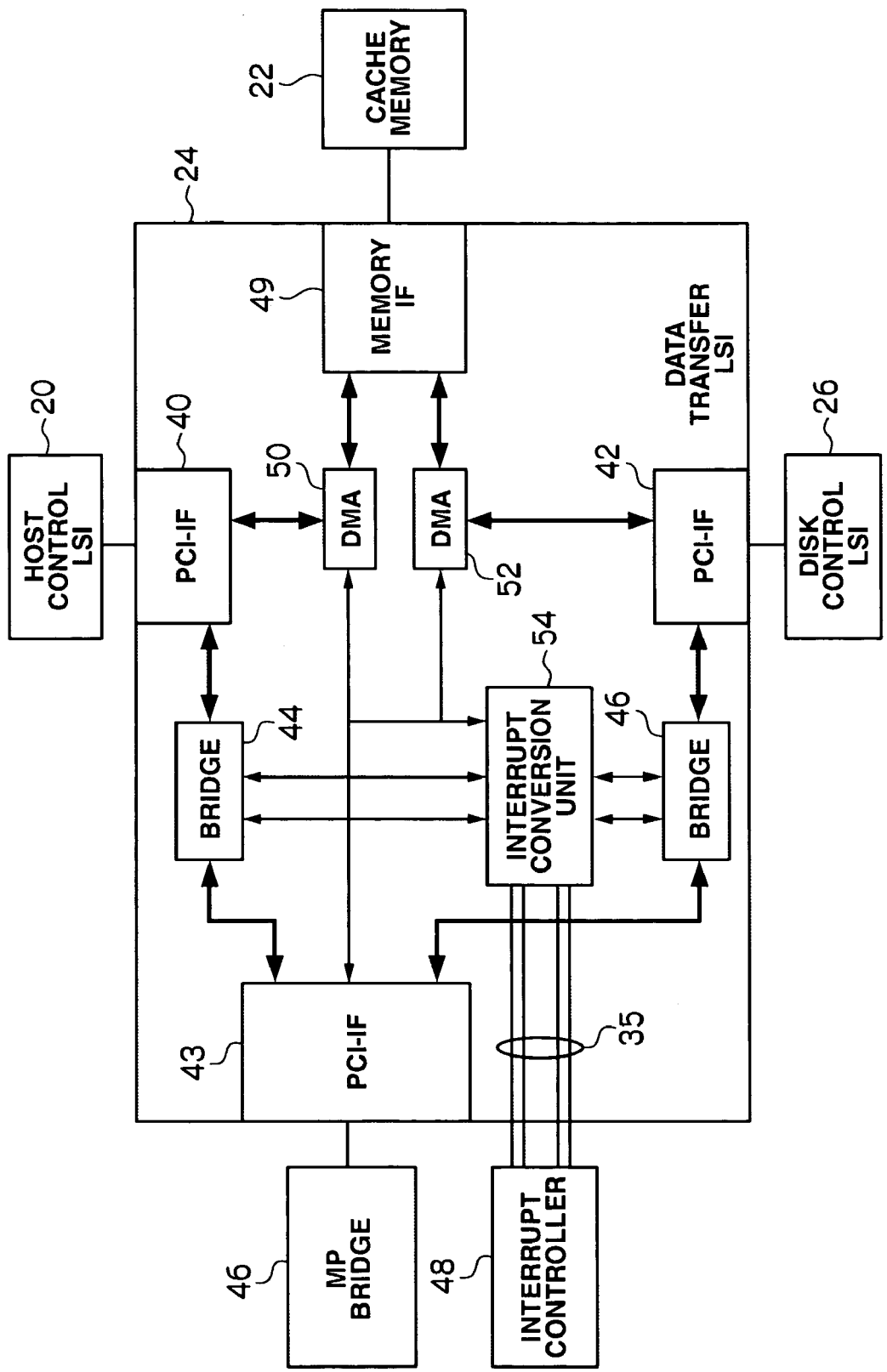
FIG. 4 is a hardware block diagram showing the specific configuration of an example of a data transfer control LSI.

FIG. 4 is a hardware block diagram explaining the configuration of the data transfer control LSI 24. The data transfer control LSI 24 includes PCI-IFs 40, 42, and 43 for controlling PCI-based communication, and a memory IF 49 for controlling the cache memory 22. The PCI-IF 40 is an interface for controlling PCI-based communication with the host control LSI 20, the PCI-IF 42 is an interface for controlling PCI-based communication with the disk control LSI 26, and the PCI-IF 43 is an interface for controlling PCI-based communication with the MP bridge 46.

The data transfer control LSI 24 further includes bridges 44 and 46 that connect the PCI-IFs, and DMAs 50 and 52 for controlling data transfer between the PCI-IFs and the memory IF in accordance with parameters set by the MP control unit 30. The data transfer control LSI 24 also includes an interrupt conversion unit 54 for converting an MSI into a signal-line-based interrupt to be output to the MP control unit 30 via the signal lines.

The bridge 44 traps an MSI between the PCI-IF 40 and PCI-IF 43, and the bridge 46 traps an MSI between the PCI-IF 42 and PCI-IF 43, and the trapped MSI is sent to the interrupt conversion unit 54. The DMA 50 and DMA 52 are connected to the cache memory 22 via the memory IF 49. The DMAs 50 and 52 are also connected to the PCI-IF 43 to enable the above-described parameter settings, and connected to the interrupt conversion unit 54 for sending interrupts that occur in the DMAs 50 and 52.

Next, an example of interrupt processing will be explained step by step, with reference to FIGS. 1-4. First, the process where the storage controller 12 transfers data sent from an information processing apparatus to the cache memory 22 will be explained. The MP control unit 30 sets a transfer parameter for the DMA 50 or 52 in the data transfer control LSI. The data transfer control LSI waits for the host control LSI 20 to start data transfer. The MP control unit instructs the host control LSI to start transfer. The host control LSI starts transferring the write data to the data transfer control LSI.

Then, the data transfer control LSI transfers and writes the data sent from the host control LSI to the cache memory 22 based on the set value in the DMA. When completing data transfer to the data transfer control LSI, the host control LSI sends an interrupt to the MP control unit (interrupt #1). The MP control unit detects from that interrupt #1 that the host control LSI has completed data transfer (interrupt processing #1). When the DMA 50 or 52 in the data transfer control LSI has completed data transfer to the cache memory, the DMA sends an interrupt (interrupt #2) to the MP control unit. The MP control unit 30 detects from that interrupt #2 that the data transfer control LSI has completed data transfer to the cache memory (interrupt processing #2).

As described above, normally, two interrupts are sent to the MP control unit 30 and the MP control unit 30 executes interrupt processing two times during the process where write data is transferred from an information processing apparatus to the cache memory.

However, as shown in FIG. 4, if the interrupt conversion unit 54 recognizes an interrupt (MSI) sent from the host control LSI 20, i.e., if the interrupt conversion unit 54 can recognize that the interrupt indicates the completion of data transfer, the interrupt conversion unit 54 may wait for a certain period of time for another interrupt sent from the DMA, put the two interrupts together, and thereby have the MP control unit 30 execute interrupt processing only once. Whether to put interrupts together or not will be determined based on the content of the interrupts, more specifically, by checking whether the content is related to the completion of data transfer according to the address for the MSI. If it is an interrupt resulting from the completion of data transfer, it will always be followed by another interrupt from an DMA, so the interrupt conversion unit 54 can wait to have two interrupts together.

If the interrupt conversion unit 54 cannot have two interrupts together even after a certain period of time, some failures can be expected to happen inside, so the interrupt conversion unit 54 can send an interrupt indicating that situation to the MP control unit. Meanwhile, where data in the cache memory is going to be transferred to the host control LSI via the DMA, the same thing can be realized by waiting for a certain period of time after having detected an interrupt from the DMA, to receive another interrupt from the host control LSI.

Figure 5:
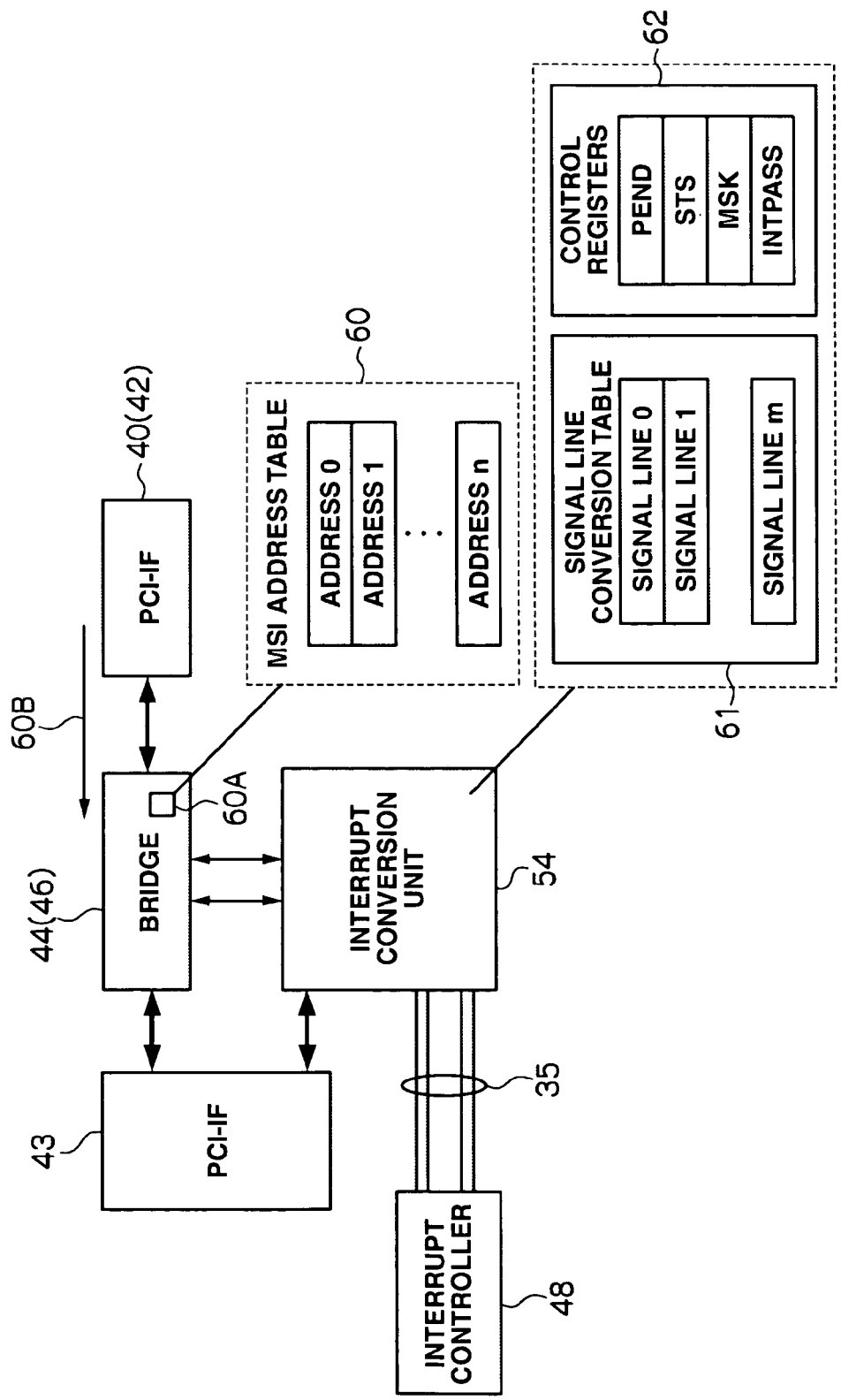
FIG. 5 is a block diagram showing the specific configuration of an interrupt conversion unit in the data transfer control LSI.

FIG. 5 is a block diagram for explaining interrupt conversion processing. Local memory 60A in the bridge 44 (46) stores an address table 60 for MSIs 60B sent from the host control LSIs 20 and the disk control LSIs 26. Using this address table, the bridge recognizes MSIs sent from the PCI-IF 40 (42) to the PCI-IF 43. The address for an MSI is determined in advance for the PCI-IF 43, so the bridge can, based on the address table 60, recognize an MSI from among control information sent from the PCI-IF 40 (42) to the PCI-IF 43.

When the bridge 44 (46) detects a command with the same address as one in the predetermined MSI address table, the bridge recognizes it as an MSI, and transfers that MSI to the interrupt conversion unit 54, instead of sending it to the PCI-IF 43. Note that address 0, . . . , address n in the MSI address table 60 indicate the addresses for MSIs.

When detecting an MSI, the interrupt conversion unit decodes and converts it into an interrupt signal sent using signal lines. Numeral 100 in FIG. 6 shows a field for converting MSIs into signal-line-based interrupt signals. This field specifies the association between an MSI and an interrupt signal. If there are four signal lines as shown in FIG. 5, each interrupt signal is composed of four bits (a, b, c, d), and each bit corresponds to "H" or "L" of a signal line. Based on the combination of bit signals, the interrupt conversion unit 54 records ON/OFF for each signal line (signal lines 0 to m) in a signal line conversion table 61.

Numeral 102 in FIG. 6 shows an interrupt handler associated with each bit interrupt signal. When receiving a bit interrupt signal from the interrupt conversion unit via the interrupt controller, the MP 1 or MP 2 in the MP control unit decides on a specific interrupt handler for the received signal, and executes that handler. Since the types of interrupt processing via the signal lines 35 are limited by the number of signal lines, the number of interrupt processing types is normally smaller than the number of types of MSI sent. The interrupt conversion unit 54 outputs an interrupt signal based on control signals stored in a control register 62.

Figure 7:
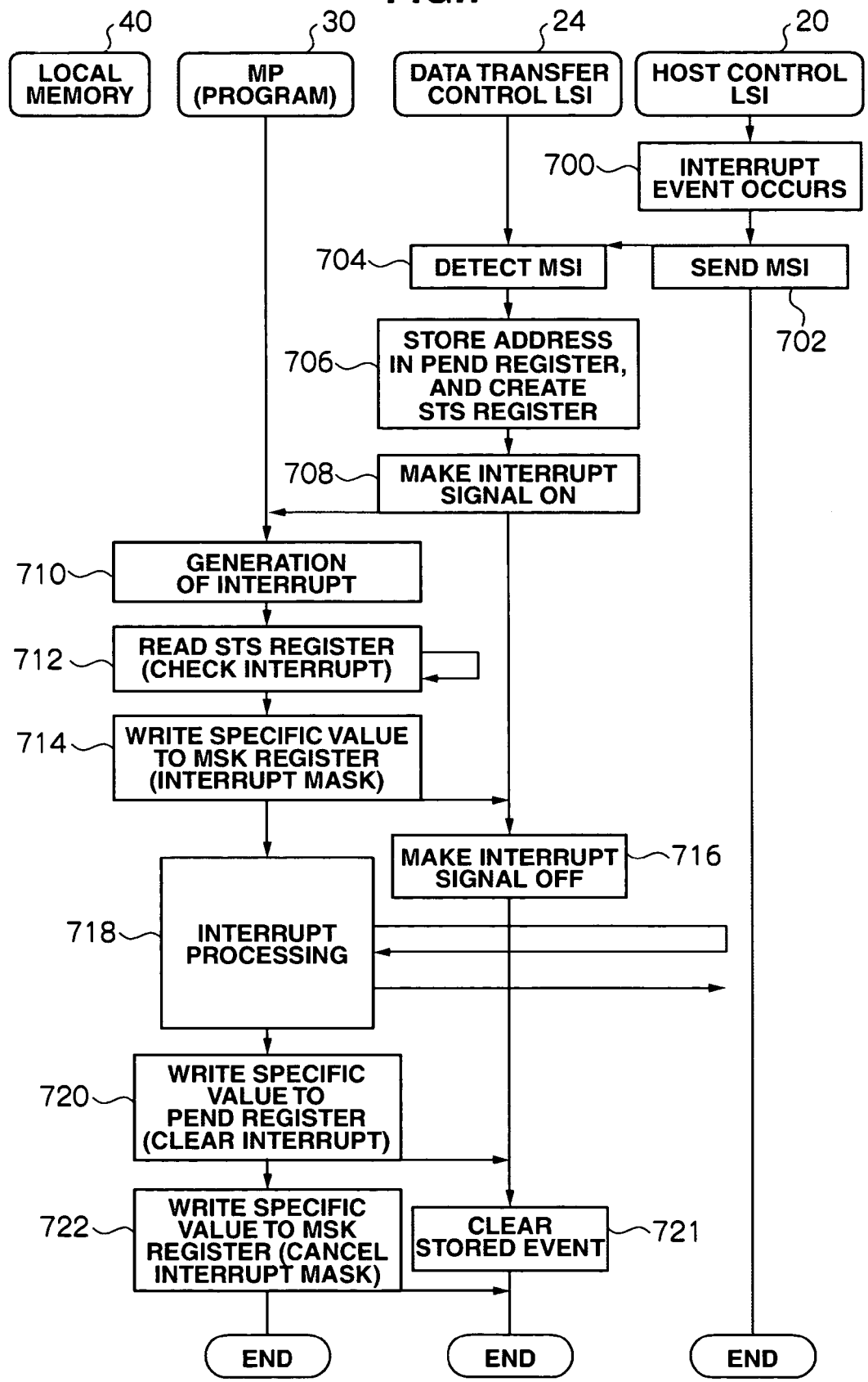
FIG. 7 is a timing chart for an example of interrupt conversion processing.

FIG. 7 is a timing chart showing interrupt signal output processing executed by the interrupt conversion unit. When an interrupt event occurs in the host control LSI (700), the host control LSI sends an MSI (702). The data transfer control LSI detects the above MSI (704), and stores the MSI event in a PEND register (706). More specifically, since each bit of the PEND register corresponds to each MSI address, the data transfer control LSI can store the event by setting "1" in the relevant bit. In other words, the PEND register is a register set when the data transfer control LSI detects an MSI.

The data transfer control LSI conducts logical multiplication of the value in the PEND register and the value in an MSK register, each bit of which corresponds to each MSI address, like the PEND register, and reflects the result in an STS register (706). The MSK register is a register to mask the PEND register, and by recording a specific value in the MSK register, the PEND register can be invalidated, i.e., a specific MSI event can be invalidated.

When detecting an MSI, the data transfer control LSI sets the PEND register. At that time, a value for validating the PEND register is stored in the MSK register, so, by referring to the STS register that reflects the logical multiplication between the two registers, ON/OFF of the signal lines is determined in accordance with FIG. 6, i.e., an interrupt signal is output to the MP control unit (program) (708).

An interrupt-signal-based interrupt is generated in the MP control unit (710). The MP control unit reads the STS register in the data transfer control LSI, and checks the interrupt (712). After checking the interrupt, the MP control unit writes a specific value to the MSK register to mask the PEND register (714). Then, the data transfer control LSI makes the interrupt signal OFF by conducting logical multiplication between the PEND register and the MSK register (716).

When checking the interrupt, the MP control unit executes interrupt processing for the host control LSI (718). After completing the interrupt processing, the MP control unit writes a specific value to the PEND register to clear the interrupt (720). This clears the event stored in the PEND register (721). The MP control unit executes write processing to the MSK register and cancels the masking for the PEND register (interrupt mask). As a result, the interrupt processing in the MP control unit in response to an MSI sent from the host control LSI ends.

Figure 8:
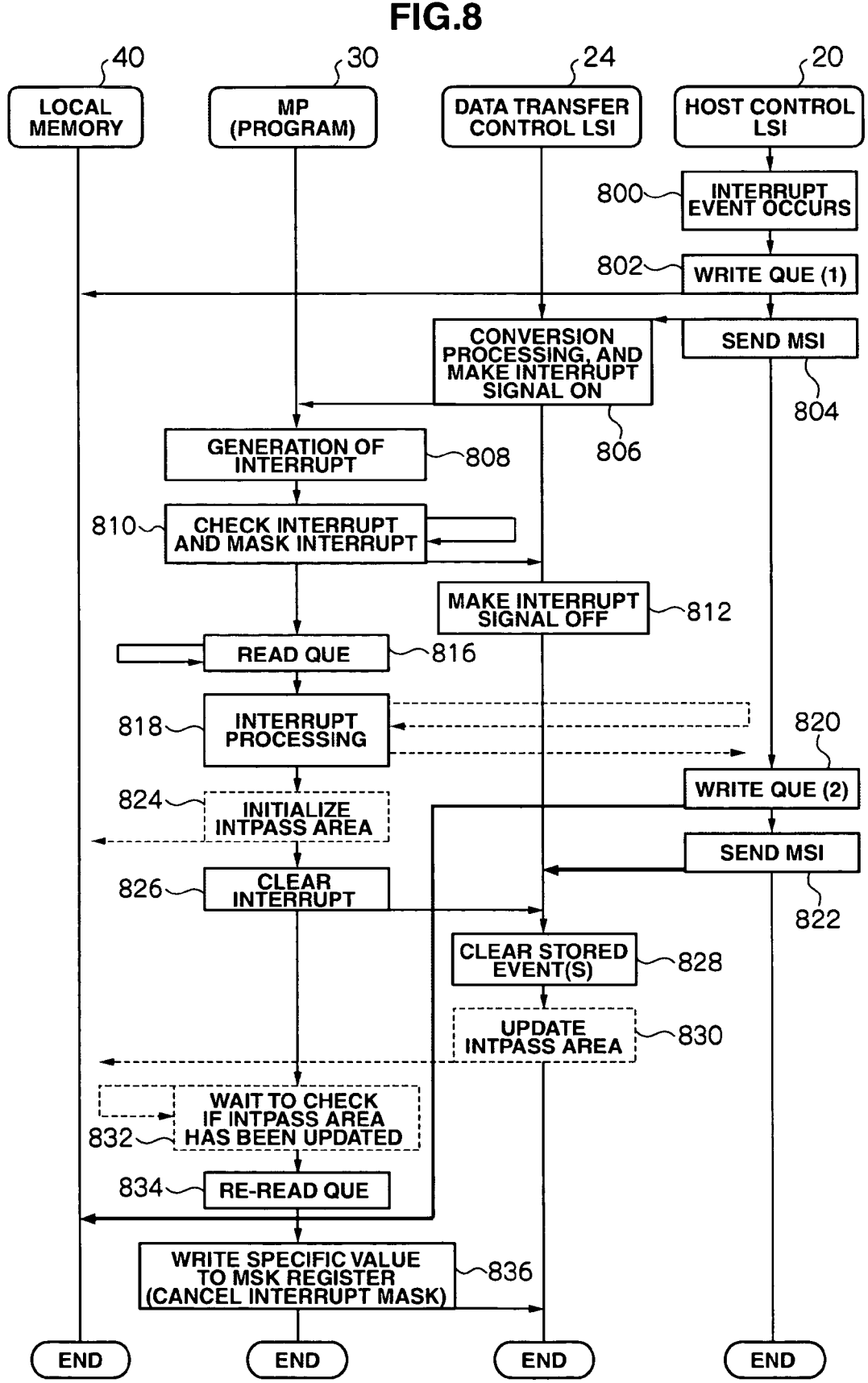
FIG. 8 is a timing chart for another example of interrupt conversion processing.
Figure 9:
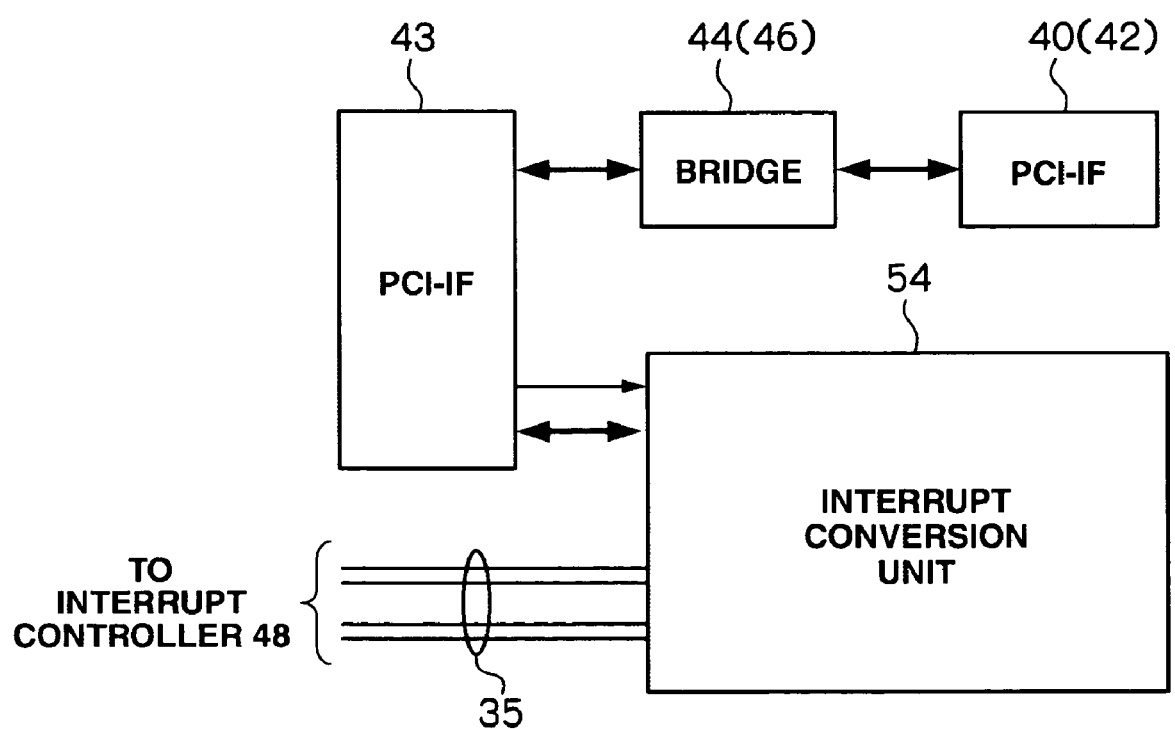
FIG. 9 is a timing chart for an example of PCI-based error processing using interrupt signal lines.

Referring further to FIG. 8, a modified interrupt processing operation executed in the interrupt conversion unit according to the present invention will be explained. This modification uses "INTPASS" in the control registers. As shown in FIG. 5, an MSI detected at the bridge 44 (46) is converted into an interrupt signal by the interrupt conversion unit 54. While a command sent from the host control LSI or the disk control LSI to the PCI-IF 43 passes through the bridge and is sent to the PCI-IF 43, the relevant MSI is sent to the interrupt conversion unit 54 via the bridge and then is sent to the interrupt controller via the signal lines 35. So, if the command is kept waiting due to the busy status in the PCI-IF 43 or a certain PCI failure, the MP control unit cannot execute interrupt processing even if it receives an interrupt signal from the interrupt conversion unit. The "INTPASS" is control information for enabling interrupt processing even in the above situation.

The details of the interrupt processing using INTPASS will be explained below. As shown in FIG. 8, the below explanation will be made assuming that while the MP control unit is executing interrupt processing for a first command QUE (1), a second command QUE (2) and the corresponding MSI are sent from the host control LSI.

If an interrupt event occurs in the host control LSI (800), the host control LSI writes QUE (1) to the local memory 40 via the PCI-IF 40, bridge 44, PCI-IF 43 and MP bridge 46 (802). When the host control LSI sends the relevant MSI after writing QUE (1) (804), the data transfer control LSI converts that MSI into an interrupt signal (806).

The MP program detects the generation of an interrupt-signal-based interrupt (808) and checks the interrupt, and then masks the interrupt (810). With that masking of the interrupt, the data transfer control LSI makes the interrupt signal OFF. The above flow is the same as 710 to 716 in FIG. 7. The MP program reads QUE (1) from the local memory (816), and executes interrupt processing. The local memory has an INTPASS area to which the "INTPASS" in the control registers 62 is written. The MP program initializes the INTPASS area (824).

Meanwhile, when the host control LSI further issues QUE (2) (820), QUE (2) passes through the bridge 44 (46) and is transmitted to the PCI-IF 43, but the relevant MSI is transmitted to the interrupt conversion unit 54, not to the PCI-IF 43, as described above (822). At that time, there is a possibility that the MSI event related to QUE (2) is also cleared at the same time as the MSI event stored in the PEND register in the interrupt conversion unit is cleared (828) based on the clearing of the interrupt by the MP program (826).

If the MP control unit reads the QUE number in the local memory again, normally, the QUE number has been updated to QUE (2), and the MP control unit can detect, from the updated number QUE (2), another interrupt based on the MSI sent in 822. However, there may also be the case where QUE (2) has not been able to be written to the local memory due to, for example, the PCI-busy status in the PCI-IF 43, and is kept waiting in the PCI-IF 43 within the data transfer control LSI. In that case, the QUE number in the local memory has not been updated, so the MP control unit cannot detect another interrupt based on QUE (2).

Here, even if the interrupt event related to QUE (2) has also been cleared in the interrupt processing based on QUE (1) (828), the data transfer control LSI writes the value in INTPASS in the control registers to the INTPASS area in the local memory and updates the area (830). The MP control unit then checks whether the INTPASS area in the local memory has been updated, re-reads the QUE number, and executes interrupt processing based on QUE(2) (832, 834). After that, the MP control unit executes write processing for the MSK register to cancel the interrupt mask.

As described above, the function using INTPASS is a function where if the data transfer control LSI receives a command to clear the interrupt from the MP control unit, a fixed value is written to an address in the local memory predetermined by the host control LSI (INTPASS area) upon the clearing of the interrupt, and the MP control unit initializes the above address before commanding the interrupt conversion unit to clear the interrupt, checks whether that address has been updated or not after sending the command for clearing of the interrupt, and thereby determines that the processing for interrupt-conversion in the data transfer control LSI has been completed. In other words, the MP control unit can detect the event related to QUE (2), by re-reading the QUE number after checking the update status.

Next, another operation in the data transfer control LSI will be explained. If a failure occurs in the PCI-IF 43 or in PCI-based communication between the MP control unit 30 and the data transfer control LSI, no failure information can be sent to the MP control unit and the MP control unit obviously cannot recognize the details of the PCI failure.

Since the interrupt conversion unit 54 in the data transfer control LSI is provided with several interrupt signal lines for converting MSIs, it is possible to inform the MP control unit of the PCI failure, i.e., failure in the data transfer control LSI, using the above signal lines. The interrupt conversion unit 54 is provided with a PCI-IF 43 interrupt line, more specifically, a signal line that changes signals if a PCI failure occurs, and the interrupt conversion unit 54 functions to read a failure register in the PCI-IF 43 if the signals have been changed. Also, the interrupt conversion unit 54 sends the content of the failure register to the MP control unit 30 using the several interrupt signal lines 35.

By decoding the interrupt signals from the interrupt signal lines, the MP control unit 30 can recognize the details of the PCI failure, which was not able to be known before. After checking the failure, the MP control unit can communicate with the data transfer control LSI to exchange various control information, using the interrupt signal lines. In other words, the interrupt signal lines can improve redundancy in a PCI bus.

According to the above-described embodiments, even if a controller does not support MSI, by converting a PCI-based MSI into an interrupt signal and outputting the converted signal to the controller, an interrupt control system using an MSI-based interrupt can be provided without upgrading the hardware or OS. The above-described embodiments are just examples, and a person skilled in the art could arbitrarily make modifications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage control system having a controller for controlling information exchange between an information processing apparatus and a storage apparatus, the controller comprising:
a first sub-controller for controlling information exchange between the controller and the information processing apparatus and also between the controller and the storage apparatus;
a second sub-controller for controlling the first sub-controller; and
a third sub-controller for controlling information exchange between the first sub-controller and the second sub-controller,
wherein the third sub-controller has an interrupt conversion unit for converting a message signal interrupt issued from the first sub-controller to the second sub-controller into an interrupt signal, and outputting the converted interrupt signal to the second sub-controller, and
when the third sub-controller receives a command to clear an interrupt from the second sub-controller, a predetermined value is written to an intpass address in a memory thereof upon the clearing of the interrupt, and the second sub-controller initializes the intpass area before commanding the interrupt conversion unit to clear the interrupt, checks whether that the intpass address has been updated or not after sending the command to clear the interrupt, and thereby determines that interrupt-conversion by the third sub-controller has been completed.

2. The storage control system according to claim 1, wherein an interrupt signal line is provided between the second sub-controller and the third sub-controller, and the interrupt conversion unit outputs the converted interrupt signal to the second sub-controller via that signal line.

3. The storage control system according to claim 1, wherein the third sub-controller comprises a first PCI interface, a second PCI interface, and a PCI bridge serving as a bridge between the first PCI interface and the second PCI interface, and
wherein the PCI bridge recognizes the message signal interrupt issued from the first PCI interface to the second PCI interface, and transfers the message signal interrupt to the interrupt conversion unit.

4. The storage control system according to claim 3, wherein the second controller comprises a microprocessor; a bridging circuit for transferring information from the second PCI interface to the microprocessor; and an interrupt control unit, the second PCI interface is connected to the bridging circuit via a PCI bus or a bus supporting MSI or MSI-X, and the interrupt control unit is connected to the signal line used for outputting the converted interrupt signal.

5. The storage control system according to claim 4, wherein the first PCI interface is connected to the first sub-controller, the second PCI interface is connected to the second sub-controller, and the first PCI interface and the first sub-controller are connected via a bus supporting MSI or MSI-X.

6. The storage control system according to claim 5, wherein the first controller comprises a first Large Scale Integrated circuit (LSI) for controlling information exchange with the information processing apparatus and a second LSI for controlling information exchange with the storage apparatus, the first PCI interface comprises a third PCI interface connected to the first LSI and a fourth PCI interface connected to the second LSI, and the first LSI and the third PCI interface, and the second LSI and the fourth PCI interface are respectively connected via the bus supporting MSI or MSI-X.

7. The storage control system according to claim 4, wherein if a failure occurs in the second PCI interface or in PCI-based communication between the second sub-controller and the third sub-controller, the interrupt conversion unit reads information of the failure from a failure register of the second PCI interface and then transmits the information via another signal line thereof to the second sub-controller.

8. The storage control system according to claim 4, wherein
a first external command is being sent through the PCI bridge, the second PCI interface and then reaches the second sub-controller, while a first corresponding message signal interrupt (MSI) is concurrently being sent to the interrupt conversion unit via the PCI bridge and converted into an interrupt signal which reaches the second sub-controller via signal lines, the second sub-controller masks the interrupt signal OFF, executes a first interrupt processing, and initializes an intpass area in a memory therein,
a subsequent external command is being sent through the PCI bridge and the second PCI interface but not reaching the second sub-controller due to a busy status of the second PCI interface or a PCI failure, while a second corresponding MSI is concurrently being sent to the interrupt conversion unit via the PCI bridge and converted into an interrupt signal which reaches the second sub-controller via signal lines, and
even if an interrupt event related to the subsequent external command is cleared in the interrupt processing based on the first external command, the third sub-controller writes a predetermined value to the intpass area in the memory and updates the intpass area, and then the second sub-controller checks whether the intpass area in the memory has been updated, re-reads a QUE number, and executes a subsequent interrupt processing based on the subsequent external command.

9. The storage control system according to claim 1, wherein the information processing apparatus is connected to the first sub-controller via a network, and the storage apparatus is located within the same storage system with the storage control system and connected to the second sub-controller.

10. An interrupt control system comprising:
a first PCI interface;
a second PCI interface;
a PCI bridge serving as a bridge between the first PCI interface and the second PCI interface; and
a control circuit for controlling an interrupt signal,
wherein the PCI bridge recognizes a message signal interrupt issued from the first PCI interface to the second PCI interface, and transfers the message signal interrupt to the control circuit,
wherein the control circuit comprises an interrupt conversion unit for converting the message signal interrupt into an interrupt signal and outputting the converted signal externally to an microprocessor (MP) control unit via a signal line, a first external command is being sent through the PCI bridge, the second PCI interface and then reaches the MP control unit, while a first corresponding message signal interrupt (MSI) is concurrently being sent to the interrupt conversion unit via the PCI bridge and converted into an interrupt signal which reaches the MP control unit via signal lines, the MP control unit masks the interrupt signal OFF, executes a first interrupt processing, and initializes an intpass area in a memory therein, a subsequent external command is being sent through the PCI bridge and the second PCI interface but not reaching the MP control unit due to a busy status of the second PCI interface or a PCI failure, while a second corresponding MSI is concurrently being sent to the interrupt conversion unit via the PCI bridge and converted into an interrupt signal which reaches the MP control unit via the signal lines, and even if an interrupt event related to the subsequent external command is cleared in the interrupt processing based on the first external command, the interrupt control system writes a predetermined value to the intpass area in the memory and updates the intpass area, and then the MP control unit checks whether the intpass area in the memory has been updated, re-reads a QUE number, and executes a subsequent interrupt processing based on the subsequent external command.

11. The interrupt control system according to claim 10, wherein the first PCI interface is connected to a first controller, the second PCI interface is connected to a MP control unit, the MP control unit has an interrupt control unit, and the interrupt conversion unit outputs the converted interrupt signal to the interrupt control unit via a signal line provided between the interrupt control unit and the interrupt conversion unit.

12. The interrupt control system according to claim 11, wherein the first controller and the first PCI interface are connected via a bus supporting MSI or MSI-X.

13. The interrupt control system according to claim 11, wherein the MP control unit and the second PCI interface are connected via a PCI bus or a bus supporting MSI or MSI-X.

14. The interrupt control system according to claim 11, wherein the control circuit detects a PCI failure, and informs the MP control unit of that failure via the signal line used to send an interrupt signal.

15. The interrupt control system according to claim 11, wherein the control circuit has a register for controlling the interrupt conversion unit, the register has a first area and a second area, the control circuit sets first information indicating that the PCI bridge has detected the message signal interrupt in the first area, the second area is to set second information for prohibiting output of the converted interrupt signal, and the control circuit determines whether or not to output the converted interrupt signal from the interrupt conversion unit, based on the first information and the second information.

16. The interrupt control system according to claim 15, wherein the MP control unit sets the second information in the second area.

17. The interrupt control system according to claim 15, wherein, when detecting an interrupt based on the converted interrupt signal, the MP control unit sets the second information in the second area, and upon the completion of processing for the interrupt, the MP control unit clears the second information and the first information.

18. The interrupt control system according to claim 1, wherein when the interrupt control system receives a command to clear the interrupt from the MP control unit, the predetermined value is written to an intpass address in the memory upon the clearing of the interrupt, and the MP control unit initializes the intpass area before commanding the interrupt conversion unit to clear the interrupt, checks whether that the intpass address has been updated or not after sending the command to clear the interrupt, and thereby determines that interrupt-conversion by the interrupt control system has been completed.

19. The interrupt control system according to claim 1, wherein if a failure occurs in the second PCI interface or in PCI-based communication between the MP control unit and the interrupt control system, the interrupt conversion unit reads information of the failure from a failure register of the second PCI interface and then transmits the information via another signal line thereof to the MP control unit.

* * * * *